(12) United States Patent
De Graaf et al.

(10) Patent No.: US 11,780,187 B2
(45) Date of Patent: *Oct. 10, 2023

(54) TRANSFER APPARATUS AND METHOD FOR TRANSFERRING ONE OR MORE PLIES ONTO A CARCASS PACKAGE ON A TIRE BUILDING DRUM

(71) Applicant: VMI HOLLAND B.V., Epe (NL)

(72) Inventors: Martin De Graaf, Epe (NL); Dave Papot, Epe (NL)

(73) Assignee: VMI HOLLAND B.V.

( * ) Notice: Subject to any disclaimer, the term of this patent is extended or adjusted under 35 U.S.C. 154(b) by 0 days.

This patent is subject to a terminal disclaimer.

(21) Appl. No.: 17/812,986

(22) Filed: Jul. 15, 2022

(65) Prior Publication Data

US 2022/0347954 A1 Nov. 3, 2022

Related U.S. Application Data

(62) Division of application No. 17/281,921, filed as application No. PCT/NL2020/050039 on Jan. 27, 2020, now Pat. No. 11,390,048.

(30) Foreign Application Priority Data

Feb. 22, 2019 (NL) .................................... 2022628

(51) Int. Cl.
*B29D 30/26* (2006.01)
*B29D 30/28* (2006.01)
*B29D 30/30* (2006.01)

(52) U.S. Cl.
CPC ......... *B29D 30/2607* (2013.01); *B29D 30/28* (2013.01); *B29D 30/30* (2013.01); *B29D 2030/2671* (2013.01)

(58) Field of Classification Search
CPC ........ B29D 30/26; B29D 30/28; B29D 30/30; B29D 2030/0022; B29D 2030/0027; B29D 2030/0038; B29D 2030/2607
See application file for complete search history.

(56) References Cited

U.S. PATENT DOCUMENTS

| 4,039,366 A | 8/1977 | Yabe ...................... B29H 17/18 |
| 4,634,489 A | 1/1987 | Dupommier ........... B29D 30/20 |

(Continued)

FOREIGN PATENT DOCUMENTS

| CN | 102862303 | 1/2013 | ............. B29D 30/26 |
| CN | 103009651 | 4/2013 | ............. B29D 30/20 |

(Continued)

OTHER PUBLICATIONS

Machine translation of WO-2016/074617-A1, patent document published May 19, 2016.*

(Continued)

*Primary Examiner* — Geoffrey L Knable
(74) *Attorney, Agent, or Firm* — HAYES SOLOWAY P.C.

(57) ABSTRACT

Disclosed are to a transfer apparatus and a method for transferring plies onto a carcass package on a tire building drum. The transfer apparatus includes a transfer ring with first ring segments and a frame that extends in a circumferential direction about a central axis for holding the first ring segments in first angular positions distributed in the circumferential direction along the frame, wherein the first ring segments are movable relative to the frame in a radial direction from a first radial distance to a second radial distance from the central axis that is smaller than the first radial distance. The transfer apparatus further includes a first rolling device that is positionable in a second angular position interposed between the first angular positions, and a second ring segment that is positionable in the second (Continued)

angular position at the second radial distance from the central axis.

2 Claims, 7 Drawing Sheets

(56) References Cited

U.S. PATENT DOCUMENTS

| | | | | |
|---|---|---|---|---|
| 5,156,713 | A | 10/1992 | Ishii | B29D 30/2607 |
| 5,948,207 | A | 9/1999 | Huisman | B29D 30/20 |
| 6,364,981 | B1 | 4/2002 | Smith et al. | 156/126 |
| 11,390,048 | B2 * | 7/2022 | De Graaf | B29D 30/2607 |
| 2021/0370627 | A1 | 12/2021 | De Graaf et al. | B29D 30/2607 |

FOREIGN PATENT DOCUMENTS

| | | | |
|---|---|---|---|
| CN | 104441718 | 3/2015 | B29D 30/20 |
| CN | 207345108 | 5/2018 | B29D 30/26 |
| CN | 109291483 | 2/2019 | B29D 30/30 |
| CN | 212353006 | 1/2021 | B29D 30/30 |
| EP | 0169162 | 1/1986 | B29D 30/20 |
| EP | 0223317 | 5/1987 | B29D 30/26 |
| JP | 5149283 | 4/1976 | B29H 17/12 |
| JP | 2001198987 | 7/2001 | B29D 23/24 |
| JP | 201674173 | 5/2016 | B29D 30/26 |
| KR | 20010068406 | 7/2001 | B29D 30/38 |
| KR | 100319661 | 1/2002 | B29D 30/38 |
| KR | 101595487 | 2/2016 | B65G 49/00 |
| RU | 1610741 | 10/1994 | B29D 30/20 |
| RU | 2247028 | 2/2005 | B29D 30/26 |
| RU | 2010146969 | 5/2012 | B29D 30/20 |
| WO | WO 2016056169 | 4/2016 | B29D 30/26 |
| WO | WO-2016/074617 A1 * | 5/2016 | |
| WO | WO 2016074617 | 5/2016 | B29D 30/28 |
| WO | WO-2019/093976 A1 * | 5/2019 | |
| WO | WO 2019093976 | 5/2019 | B29D 30/2607 |

OTHER PUBLICATIONS

Russian Decision to Grant issued in related Russian Patent Application Serial No. 2021108262, dated Jun. 9, 2023 with machine translation (22 pages).*
First Office Action issued in Chinese Patent Appln. Serial No. 202010099294.3, dated Mar. 11, 2022, with English translation, 10 pages.
Reason for Refusal issued in Japanese Patent: Appln. Serial No. 2021-517681, dated Jan. 18, 2022, with machine translation, 5 pages.
Korean Decision to Grant issued in related Korean Patent Application Serial No. 10-2020-7013400, dated Feb. 6, 2021 with machine translation (7 pages).
PCT Report and Written Opinion issued in Netherlands Application NL2022628, dated Oct. 7, 2019 (9 pages).
Office Action issued in U.S. Appl. No. 17/281,921, dated Jan. 13, 2022, 23 pages.
Notice of Allowance issued in U.S. Appl. No. 17/281,921, dated Apr. 26, 2022, 19 pages.

* cited by examiner

TRANSFER APPARATUS AND METHOD FOR TRANSFERRING ONE OR MORE PLIES ONTO A CARCASS PACKAGE ON A TIRE BUILDING DRUM

CROSS REFERENCE TO RELATED APPLICATIONS

This application is a divisional of U.S. patent application Ser. No. 17/281,921, filed Mar. 31, 2021, which in turn is a US National Phase Application of PCT/NL2020/050039, Filed Jan. 27, 2020, which claims priority to Netherlands Application Serial No. 2022628, filed Feb. 22, 2019, the contents of which are incorporated herein by reference.

BACKGROUND

The invention relates to a transfer apparatus and a method for transferring one or more plies onto a carcass package on a tire building drum.

A known transfer apparatus comprises a transfer ring for transferring a breaker ply onto a carcass package on a tire building drum. The transfer ring is provided with a plurality of ring segments and a frame that extends in a circumferential direction about a central axis for holding the plurality of ring segments in a plurality of angular positions distributed in the circumferential direction along the frame. The ring segments are radially movable relative to the frame to hold and release the breaker ply. The transfer ring further comprises a center roller for stitching the breaker ply to the carcass package on the tire building drum in a central area of the tire building drum and two shoulder rollers for stitching the breaker ply along the shoulders of the tire to be formed.

SUMMARY OF THE INVENTION

A disadvantage of the known transfer apparatus is that the center roller and the two shoulder rollers occupy a part of the circumference of the transfer ring, typically at the top of the transfer ring. At that angular position, there is no space to mount a ring segment. As a consequence, the distribution of the ring segments in the circumferential direction along the frame is locally interrupted. Meanwhile, the industry demands increasingly thinner breaker plies which are more likely to deform when not properly engaged by the ring segments of the transfer ring. In particular, the relative thin breaker plies tend to behave unpredictably and/or bulge considerably in the absence of a ring segment at the location of the center roller and the two shoulder rollers.

In an attempt to solve the problem, the applicant has considered to lower the center roller to provide additional support to the breaker ply at the location where the ring segment is absent. However, the cylindrical shape and/or free rolling nature of the center roll actually increases the unpredictable behavior of relative thin breaker ply.

Hence, with the known transfer apparatus it is difficult to keep the relatively thin breaker plies circular in order to reliably transfer said breaker plies to a carcass package on the tire building drum.

It is an object of the present invention to provide a transfer apparatus and a method for transferring one or more plies onto a carcass package on a tire building drum, wherein the reliability of the transfer can be improved.

According to a first aspect, the invention provides a transfer apparatus for transferring one or more plies onto a carcass package on a tire building drum, wherein the transfer apparatus comprises a transfer ring with a plurality of first ring segments and a frame that extends in a circumferential direction about a central axis for holding each of the plurality of first ring segments in a respective first angular position, wherein the first angular positions of the plurality of first ring segments are distributed in the circumferential direction along the frame, wherein the plurality of first ring segments are movable relative to the frame in a radial direction perpendicular to the central axis from a first radial distance to a second radial distance from the central axis that is smaller than the first radial distance, wherein the transfer apparatus further comprises a first rolling device that is positionable in a second angular position interposed between the plurality of first angular positions in the circumferential direction, wherein the transfer apparatus further comprises a second ring segment that is positionable in the second angular position at the second radial distance from the central axis.

The second ring segment may alternate with or supplement the first rolling device in the second angular position. In particular, the second ring segment can contact, engage and/or hold the one or more plies at the second angular position when transferring said one or more plies onto the carcass package on the tire building drum. Hence, the one or more plies can be held and/or supported by the transfer apparatus more evenly, more uniformly or more reliably in the circumferential direction, thereby reducing and/or preventing the negative effects of the absence of a first ring segment at the second angular position. The one or more plies can thus be kept more circular during the transfer, thereby improving the reliability of said transfer. This can be particularly advantageous when transferring one or more relatively thin breaker plies.

In a preferred embodiment the second ring segment is adapted to accommodate the first rolling device when the second ring segment and the first rolling device are in the second angular position at the second radial distance simultaneously. Hence, the second ring segment does not have to alternate with the first rolling device to be at the second radial distance. In other words, the first rolling device does not have to be moved clear from the second radial distance for the second ring segment to be moved into the second angular position at the second radial distance. This can save valuable time when switching from transfer to stitching of the one or more plies on the carcass package on the tire building drum.

In another embodiment the first rolling device is movable from the second radial distance to a third radial distance from the central axis that is smaller than the second radial distance, wherein the second ring segment allows for passage of at least a part of the first rolling device beyond the second ring segment to the third radial distance when the second ring segment is in the second angular position at the second radial distance. Hence, the first rolling device can be moved into an stitching position beyond the second ring segment in the radially inward direction so as to apply and/or press the one or more plies onto the carcass package on the tire building drum, while the second ring segment remains at the second radial distance.

In another embodiment the second ring segment allows for passage of the entire first rolling device through said second ring segment. The first rolling device can thus be passed completely through the second ring segment. Consequently, the second ring segment can be passed completely along the first rolling device without colliding and can therefore move independently from the first rolling device.

In other words, the first rolling device and the second ring segment may alternate and/or switch positions.

In another embodiment the second ring segment is retractable in the radial direction from the second radial distance towards the first radial distance, wherein the second ring segment is arranged for passing along the first rolling device in the radial direction when the first rolling device is at the second radial distance. The second ring segment can thus be retracted while the first rolling device remains in place. This can save valuable time when switching from transfer to stitching of the one or more plies.

In another embodiment the first rolling device and the second ring segment are coaxially movable in the radial direction. In other words, the first rolling device and the second ring segment can pass each other along the same axis in the radial direction. Hence, the first rolling device and the second ring segment can both be aligned in the second angular position and move in the radial direction, i.e. between the first radial distance and the second radial distance.

In another embodiment the second ring segment comprises a first leg extending at a first side of the first rolling device in the circumferential direction and a second leg extending at a second side of the first rolling device in the circumferential direction opposite to the first side. The first leg and the second leg can contact the one or more plies at the second radial distance at opposite sides of the first rolling device in the circumferential direction without interfering with the operation of said first rolling device.

Preferably, the second ring segment further comprises a first connecting member and a second connecting member interconnecting the first leg and the second leg at a third side of the first rolling device in an axial direction parallel to the central axis and at a fourth side of the first rolling device in the axial direction opposite to the third side, respectively. By interconnecting the first leg and the second leg, the legs of the second ring segment can be positioned more accurately relative to each other. In other words, the second ring segment can be more rigid.

More preferably, the first leg, the second leg, the first connecting member and the second connecting member form a shell around the first side, the second side, the third side and the fourth side of the first rolling device when the second ring segment and the first rolling device are at the second radial distance simultaneously. The first rolling device can be nested inside the shell at the second radial distance. By having the shell, it can be prevented that the first rolling device inadvertently contacts the one or more plies.

In another embodiment the second ring segment is arranged to move together with first ring segments from the first radial distance to the second radial distance. The second ring segment can thus be operated in the same or substantially the same way as the first ring segments.

In another embodiment the first ring segments and/or the second ring segment are fixed against rotation relative to the frame. The first ring segments and/or the second ring segment can thus be kept stationary in their respective angular positions when at a specific radial distance from the central axis. In contrast, as specified below, the first rolling device may be rotatable, i.e. a roller.

In another embodiment the first ring segments and/or the second ring segment comprise one or more retaining elements for retaining the one or more plies. Preferably, the one or more retaining elements comprises magnets, vacuum openings and/or needles. The one or more plies can thus be held more reliably compared to a situation in which the one or more plies are held through contact only. This is particularly advantageous in combination with relatively thin breaker plies, which may not be rigid enough in themselves to keep the circular shape.

In another embodiment the first rolling device comprises a roller. The roller can be used to roll over the one or more plies during stitching on the carcass package on the tire building drum when said tire building drum is rotating. In particular, the roller may be rotatable about a roller axis parallel or substantially parallel to the rotation axis of the tire building drum.

Preferably, the first rolling device comprises a center roller for stitching the one or more plies on the carcass package on the tire building drum. Said center roller is arranged to press or stitch the one or more plies onto the carcass package on the tire building drum in a central area of said one or more plies.

Alternatively, the first rolling device comprises one or more shoulder wheels for stitching the one or more plies on the carcass package on the tire building drum. The one or more shoulder wheels can be used to press or stitch the one or more plies against a shaped carcass on the tire building drum, i.e. by following the contour of the so-called 'shoulders' of said carcass.

In case of the embodiment where the first rolling device is the center roller, the transfer apparatus may further comprise a second rolling device that is positionable in a third angular position interposed between the plurality of first angular positions in the circumferential direction, wherein the transfer apparatus further comprises a third ring segment that is positionable in the third angular position at the second radial distance from the central axis. Similarly to the second ring segment, the third ring segment may alternate with or supplement the second rolling device in the third angular position. In particular, the third ring segment can contact, engage and/or hold the one or more plies at the third angular position when transferring said one or more plies onto the carcass package on the tire building drum. Hence, the one or more plies can be held and/or supported by the transfer apparatus more evenly in the circumferential direction, thereby reducing and/or preventing the negative effects of the absence of a first ring segment at the third angular position.

Preferably, said second rolling device comprises one or more shoulder wheels for stitching the one or more plies on the carcass package on the tire building drum. The one or more shoulder wheels can be used to press or stitch the one or more plies against a shaped carcass on the tire building drum, i.e. by following the contour of the so-called 'shoulders' of said carcass.

According to a second aspect, the invention provides a method for transferring one or more plies onto a carcass package on a tire building drum using the transfer apparatus according to any one of the aforementioned embodiments, wherein the method comprises the step of positioning the second ring segment in the second angular position at the second radial distance from the central axis.

The method relates to the practical implementation of the transfer apparatus and thus provides the same technical advantages as the transfer apparatus and its respective embodiments. Said technical advantages will not be repeated hereafter for conciseness.

In a preferred embodiment, prior to, simultaneously with or after the step of positioning the second ring segment in the second angular position at the second radial distance from the central axis, the method comprises the step of positioning the first rolling device in the second angular position at the second radial distance, wherein the second ring segment accommodates the first rolling device when the second ring segment and the first rolling device are in the second angular position at the second radial distance simultaneously.

In another embodiment the method further comprises the step of moving the first rolling device from the second radial distance to a third radial distance from the central axis that is smaller than the second radial distance while the second ring segment remains at the second radial distance, wherein the first rolling device protrudes at least partially beyond second ring segment to the third radial distance when the second ring segment is in the second angular position at the second radial distance.

In another embodiment the method further comprises the step of passing the first rolling device entirely through second ring segment.

In another embodiment the method further comprises the step of retracting the second ring segment in the radial direction from the second radial distance towards the first radial distance while the first rolling device remains at the second radial distance, wherein the second ring segment passes along the first rolling device in the radial direction when the first rolling device remains at the second radial distance.

In another embodiment the second ring segment is moved together with first ring segments from the first radial distance to the second radial distance.

In another embodiment the first rolling device comprises a roller, wherein the roller rolls over the one or more plies during stitching on the carcass package on the tire building drum.

In another embodiment the transfer apparatus further comprises a second rolling device that is positionable in a third angular position interposed between the plurality of first angular positions in the circumferential direction, wherein the transfer apparatus further comprises a third ring segment that is positionable in the third angular position at the second radial distance from the central axis.

Additionally or alternatively, the transfer apparatus further comprises two shoulder wheels that are positionable in a third angular position interposed between the plurality of first angular positions in the circumferential direction, wherein the method further comprises the step of moving the two shoulder wheels apart at the second radial distance in an axial direction parallel to the central axis to match a width of the one or more plies in said axial direction. The two shoulder wheels may provide additional support to the one or more plies during the transfer at the longitudinal edges thereof.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-4 and 6-8 show a transfer apparatus 1 according to a first embodiment of the invention. The transfer apparatus 1 is used for transferring one or more plies (not shown), in particular one or more breaker plies, onto a carcass package (not shown) on a tire building drum 9.

The tire building drum 9 comprises a number of radially expandable drum segments 90 to shape a carcass (not shown) in a manner known per se. The tire building drum 9 comprises a plurality of magnets distributed over the drum segments 90. The plurality of magnets comprises one or more tip magnets 91 for holding the leading tip or end and/or the trailing tip or end of the one more plies. The magnets may be of different type, size or strength. Alternatively, all of the magnets may be the same type, size and/or strength, but the number of magnets may be varied per drum segment. Typically, the tip magnets 91 generate the largest or strongest magnetic field.

Figure 1:
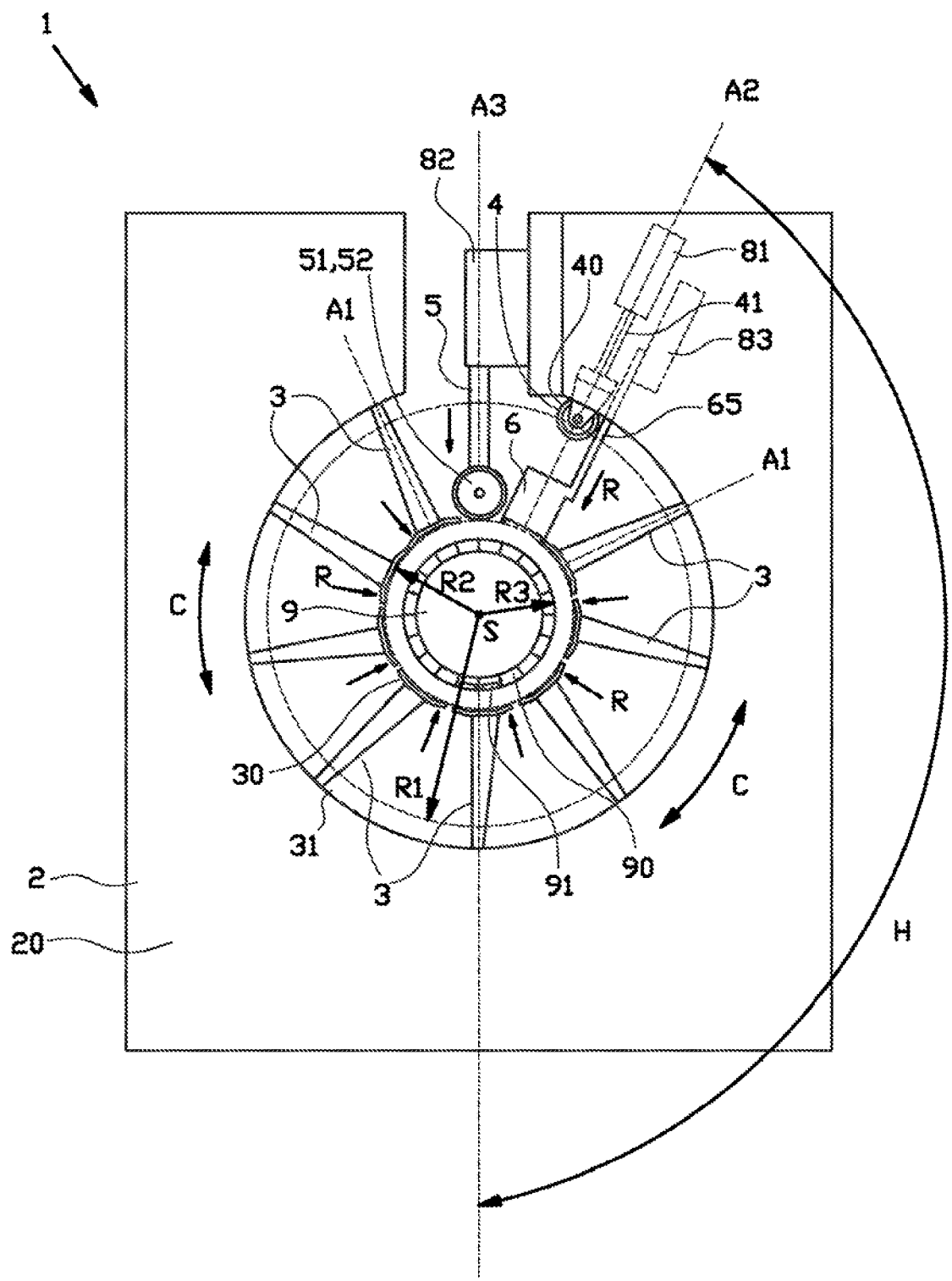
FIGS. 1-4 shows side views of a transfer apparatus with a transfer ring, a first rolling device, a second rolling device, first ring segments and a second ring segment according to a first embodiment of the invention during different steps of a method for transferring one or more plies onto a carcass package on a tire building drum.
Figure 6:
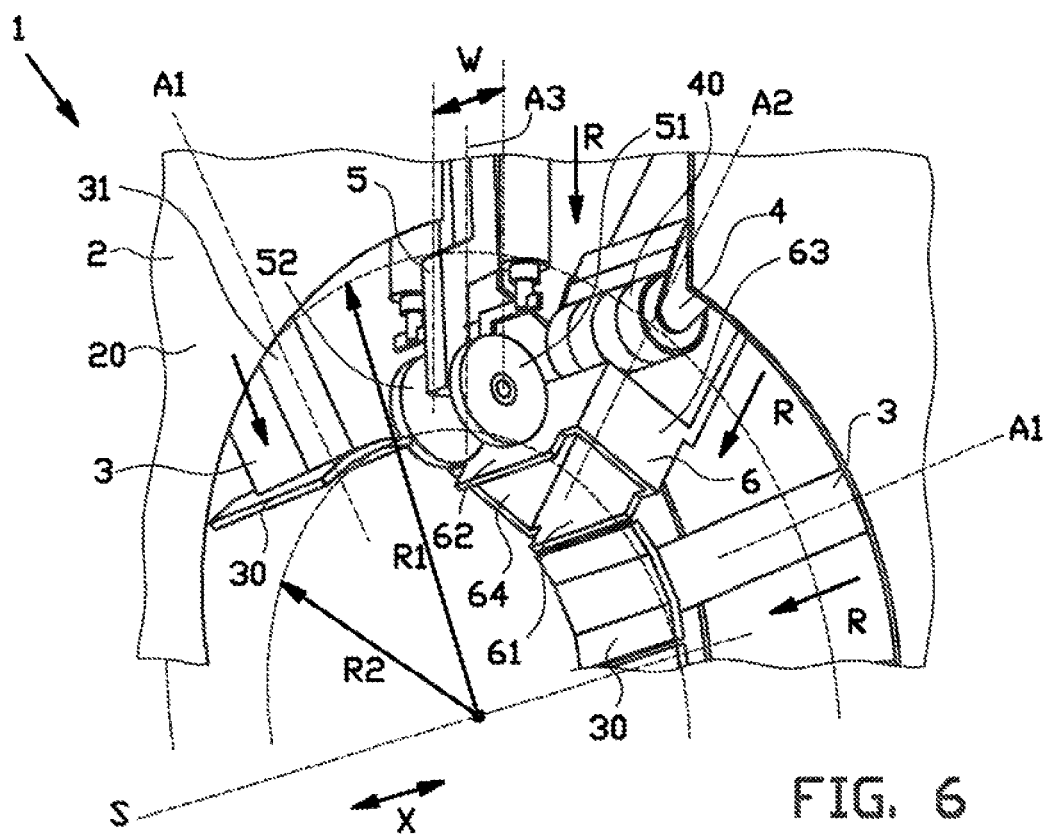
FIGS. 6, 7 and 8 show perspective views of the transfer apparatus according to FIGS. 1, 3 and 4, respectively.

As shown in FIGS. 1 and 6, the transfer apparatus 1 comprises a transfer ring 2 for holding the one or more plies during the transfer towards and/or onto the carcass package on the tire building drum 9. The transfer ring 2 comprises a plurality of first ring segments 3 and a frame 20 that extends in a circumferential direction C about a central axis S for holding the plurality of first ring segments 3. The frame 20 is arranged for holding each first ring segment 3 of the plurality of first ring segments 3 in a respective first angular positions A1. The first angular positions A1 of the plurality of first ring segments 3 are distributed in the circumferential direction C along the frame 20. In the context of the present invention, the 'angular position' is to be interpreted as: the orientation of an object, in this case the first ring segment 3, with respect to a reference position as expressed by the amount of rotation necessary to change from one orientation to the other about the central axis S. The first angular positions A1 may for example be expressed in degrees or radians relative to a zero position (typically the top of the transfer ring 2). In this exemplary embodiment, the first angular positions A1 are evenly spaced apart over approximately forty degrees.

Note that for the purpose of holding the first ring segments 3, the frame 20 itself does not have to be circular. In this exemplary embodiment, the inner contour of the frame 20 is circular, while the outer contour can have any suitable shape depending on the configuration of the transfer apparatus 1. The frame 20 may for example hold one or more drives for controlling the operation and/or movement of the transfer apparatus 1. Moreover, the frame 20 may be interrupted in the circumferential direction C, for example as shown at the top. Hence, the frame 20 does not necessarily form a closed annulus.

Each first ring segment 3 of the plurality of first ring segments 3 comprises a gripper head 30 and an arm 31 that connects said gripper head 30 to a radial drive (not shown) for the respective first ring segment 3 in the frame 20.

As shown when comparing FIGS. 1 and 3 or FIGS. 6 and 8, the plurality of first ring segments 3 are movable relative to the frame 20 in a radial direction R perpendicular to the central axis S from a first radial distance R1 (FIG. 3) to or up to a second radial distance R2 (FIG. 1) from the central axis S that is smaller than the first radial distance R1. In other words, the plurality of first ring segments 3 are in an extended state towards the central axis S in FIG. 1 and in a contracted stated away from the central axis S in FIG. 3. The second radial distance R2 may be chosen to substantially match the diameter of the one or more plies to be transferred. Hence, in at the second radial distance R2, the gripper heads 30 of the plurality of first ring segments 3 are arranged to abut and/or contact the one or more plies. The first ring segments 3 may be provided with one or more retaining elements (not shown) for retaining the one or more plies to the respective first ring segment 3. The gripper heads 30 may for example be provided with one or more magnets, vacuum openings and/or needles to engage the one or more plies.

The plurality of first ring segments 3 are preferably fixed against rotation relative to the frame 20. More in particular, the first ring segments 3 do not act like rotating bodies, such as rollers. In other words, the plurality of first ring segments 3 can be moved into abutment or contact with the one or more plies and can subsequently be held stationary or substantially stationary relative to the frame 20 during the transfer to reliably hold said one more plies.

As shown in FIGS. 1 and 6, the transfer apparatus 1 further comprises a first rolling device 4 that is positionable in a second angular position A2 and a second rolling device 5 that is positionable in a third angular position A3. In this exemplary embodiment, the second angular position A2 and the third angular position A3 are located at or near the top of the frame 20. The second angular position A2 and the third angular position A3 may also be in an alternative location, i.e. at or near one of the sides or even at the bottom of the frame 20. The second angular position A2 and the third angular position A3 are interposed or placed between the plurality of first angular positions A1 in the circumferential direction C. In particular, the second angular position A2 and the third angular position A3 are located in the circumferential direction C between two consecutive first angular positions A1. In the example as shown, the second angular position A2 and the third angular position A3 are located close to each other, i.e. as a group between two consecutive first angular positions A1. Alternatively, the second angular position A2 and the third angular position A3 may be separated and/or between different pairs of consecutive first angular positions A1.

The second angular position A2 is located off-center between two consecutive first angular positions A1 of the plurality of first angular positions A1 in the circumferential direction C to prevent harmonic effects in the one or more plies during the transfer.

Preferably, the rolling devices 4, 5 are arranged to roll over the one or more plies to press, stitch and/or splice them against the carcass at the tire building drum 9. In this example, both rolling devices 4, 5 comprise a roller. In particular, the first rolling device 4 comprises a center roller 40 for pressing, stitching and/or splicing a central area of the one or more plies onto a carcass (not shown) at the tire building drum 1 in a manner known per se. The center roller 40 is rotatable about a roller axis parallel to the axial direction X. The first rolling device 4 further comprises an arm 41 for holding the center roller 40 relative to the frame 20. As best seen in FIG. 6, the second rolling device 5 comprises two shoulder roller 51, 52 for pressing, stitching and/or splicing the one or more plies around the so-called 'shoulders' of a shaped carcass (not shown) on the tire building drum 1 in a manner known per se. The shoulder rollers 51, 52 can be spaced apart over a variable width W in an axial direction X parallel to the central axis S.

Figure 3:
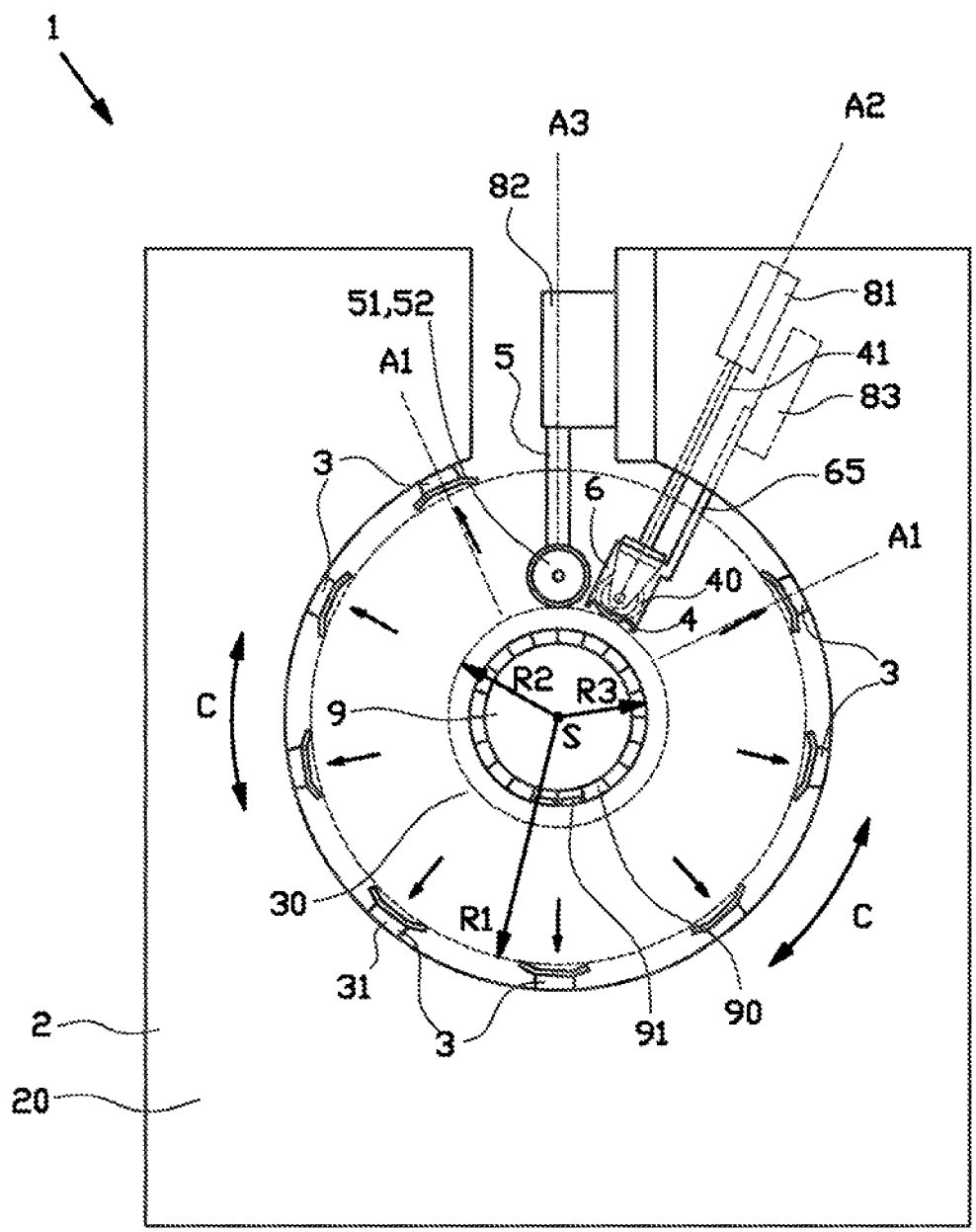
Figure 7:
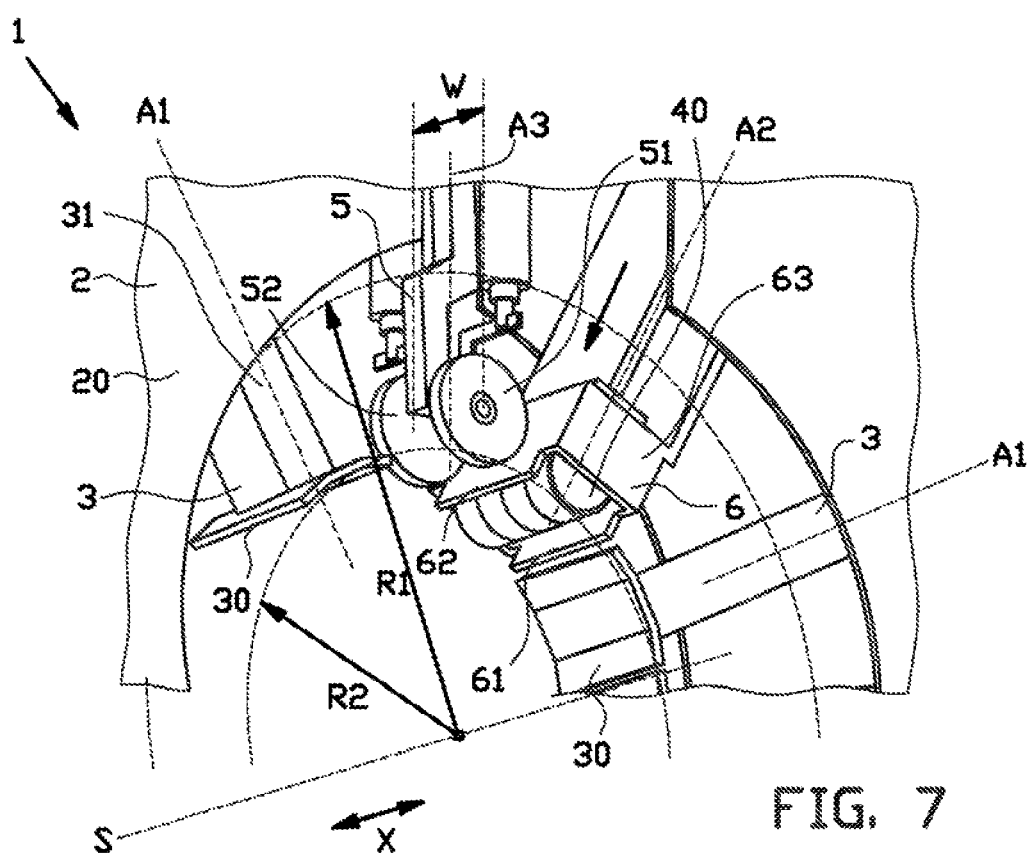

As shown in FIGS. 3 and 7, the first rolling device 4 and/or the second rolling device 5 are positionable at the second radial distance R2 from the central axis S to optionally contribute to holding the one or more plies during the transfer. In this exemplary embodiment, as shown in FIG. 1, the transfer apparatus 1 comprises a first roller drive 81 and a second roller drive 82 for driving the first rolling device 4 and the second rolling device 5, respectively. The first rolling device 4 and/or the second rolling device 5 are movable in the radial direction R towards the second radial distance R2 and beyond. More in particular, the first rolling device 4 and/or the second rolling device 5 are movable to or up to a third radial distance R3 smaller than the second radial distance R2. At said third radial distance R3, the first rolling device 4 and/or the second rolling device 5 are located radially inwards of the first ring segments 3, at or near the tire building drum 9 for pressing, stitching and/or splicing the one or more plies against a carcass (not shown) at said tire building drum 9.

Note that the first ring segments 3 are absent at the location of the first rolling device 4 and the second rolling device 5 at the second angular position A2 and the third angular position A3, respectively. There is simply no space to accommodate the conventional first ring segments 3 at the respective angular positions A2, A3. Hence, at least locally at the second angular position A2 and/or the third angular position A3, the one or more plies can not be held by the plurality of first ring segments 3. This may lead to deformation of the one or more plies. The present invention aims to solve this problem as elucidated below.

As shown in FIGS. 1 and 6 the transfer apparatus 1 further comprises a second ring segment 6 that is positionable in the second angular position A2, hence in the same angular position as the first rolling device 4. In particular, the second ring segment 6 is positionable at the second radial distance R2 from the central axis S. As such, the second ring segment 6 can contribute to the holding of the one or more plies during the transfer at a position where the plurality of first ring segments 3 are unable to do so. The second ring segment 6 may be provided with one or more retaining elements (not shown) for retaining the one or more plies to the second ring segment 6. The second ring segment 6 may for example be provided with one or more magnets, vacuum openings and/or needles to engage the one or more plies.

As shown when comparing FIGS. 1 and 4 or FIGS. 6 and 8, the second ring segment 6 is movable in the radial direction R from the second radial distance R2 towards the first radial distance R1 and vice versa. More in particular, the first rolling device 4 and the second ring segment 6 are both movable in said radial direction R. In this exemplary embodiment, the first rolling device 4 and the second ring segment 6 are coaxially movable in the radial direction R. In other words, the first rolling device 4 and the second ring segment 6 are movable along the same axis, being the axis that is aligned with or collinear with the second angular position A2.

The second ring segment 6 may be arranged to move together with first ring segments 3 from the first radial distance R1 to the second radial distance R2. In other words, the transfer apparatus 1 may be provided with a control unit (not shown) that controls the drives of the first ring segments 3 and the second ring segment drive 6 to move the corresponding ring segments 3, 6 simultaneously and to the same extent.

As schematically shown in FIG. 1, the transfer apparatus 1 comprises a second ring segment drive 83 that is located to the side of the first roller drive 81 and/or the arm 41 of the first rolling device 4 so that it does not interfere with the operation of the first roller drive 81 nor with the movement of the first rolling device 4. Hence, the first rolling device 4 and the second ring segment 83 can be operated, controlled and/or moved independently.

Figure 4:
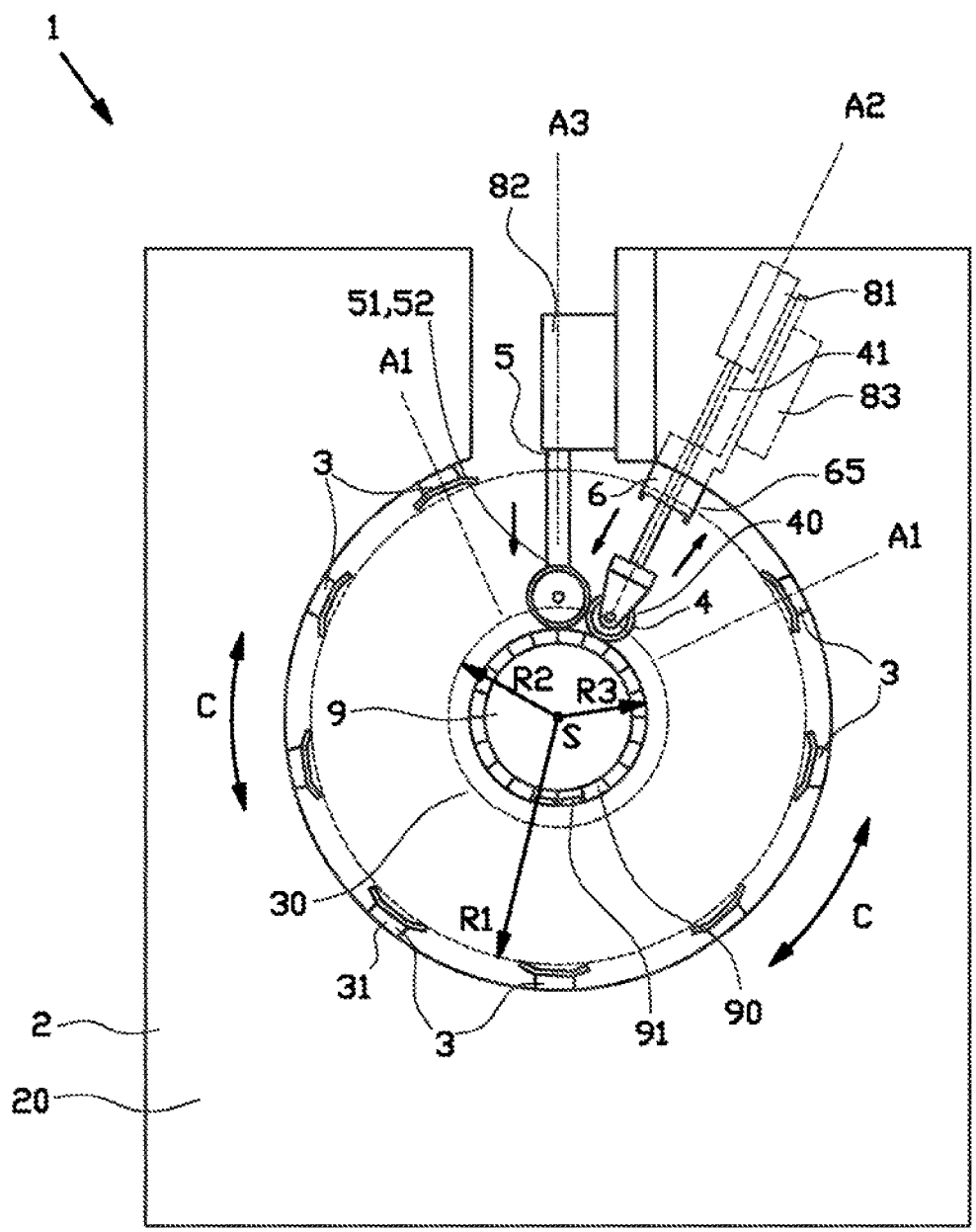

As shown in FIGS. 3 and 7, the second ring segment 6 is adapted, configured, shaped and/or dimensioned to accommodate the first rolling device 4 when the second ring segment 6 and the first rolling device 4 are in the second angular position A2 at the second radial distance R2 simultaneously. In particular, the second ring segment 6 allows for passage of at least a part of the first rolling device 4 through the second ring segment 6. In particular, the second ring segment 6 allows for passage of the entire first rolling device 4 beyond or through said second ring segment 6. The first rolling device 4 may thus be moved through or protrude beyond the second ring segment 6 partially or completely, to the third radial distance R3 from the central axis S, as shown in FIG. 4. The second ring segment 6 may also be retracted from the second radial distance R2 towards the first radial distance R1 while passing along the first rolling device 4 as it remains in place at the second radial distance R2, as shown by way of example in FIGS. 4 and 8.

As best seen in FIG. 6, the second ring segment 6 comprises a first leg 61 extending at a first side of the first rolling device 4 in the circumferential direction C and a second leg 61 extending at a second side of the first rolling device 4 in the circumferential direction C opposite to the first side. The two legs 61, 62 are able to contact the one or more plies at the second radial distance R2 at opposite sides of the first rolling device 4 in the circumferential direction C without interfering with the operation of said first rolling device 4. Preferably, the legs 61, 62 form a contact surface for contacting the one or more plies that interacts with the one or more plies in a similar way as the gripper heads 30 of the plurality of first ring segments 3. In particular, the legs 61, 62 form contact surfaces that extends linearly parallel to the central axis S. Note that the gripper heads 30 of the plurality of first ring segments 3 are slightly concave compared to the second radial distance R2 and thus also contact the one or more plies along two linearly extending, parallel contact surfaces.

The one or more retaining elements of the second ring segment may be provided in or at the legs 61, 62.

The second ring segment 6 further comprises a first connecting member 63 and a second connecting member 64 interconnecting the first leg 61 and the second leg 62 at a third side of the first rolling device 4 in the axial direction X parallel to the central axis S and at a fourth side of the first rolling device 4 in the axial direction X opposite to the third side, respectively. By interconnecting the first leg 61 and the second leg 62, the legs 61, 62 of the second ring segment 6 can be positioned more accurately relative to each other. In other words, the second ring segment 6 can be more rigid. In addition, the first leg 61, the second leg 62, the first connecting member 63 and the second connecting member 64 can form a shell around the first side, the second side, the third side and the fourth side of the first rolling device 4 when the second ring segment 6 and the first rolling device 4 are at the second radial distance R2 simultaneously. In other words, the second ring segment 6 is hollow to accommodate the first rolling device 4 at least partially inside its outer boundaries.

As best seen in FIG. 1, the second ring segment 6 further comprises an arm 65 that extends along one of the sides of the first rolling device 4 in the circumferential direction C for holding the second ring segment 6 relative to the frame 20. In particular, the arm 65 of the second ring segment 6 operationally connects the second ring segment 6 to the corresponding second ring segment drive 83. The arm 65 is located to the side of the first rolling device 4 so that it does not interfere with the movement of said first rolling device 4 in the radial direction R. It is noted that the arm 65 of the second ring segment 6 may alternatively be placed at a side of the first rolling device 4 in the axial direction X parallel to the central axis S.

The second ring segment 6 may be retrofitted to an existing transfer apparatus, in which case all of the aforementioned features of the second ring segment 6 are to be interpreted as suitable for use in an existing transfer apparatus in combination with the first rolling device of said existing transfer apparatus.

Figure 5:
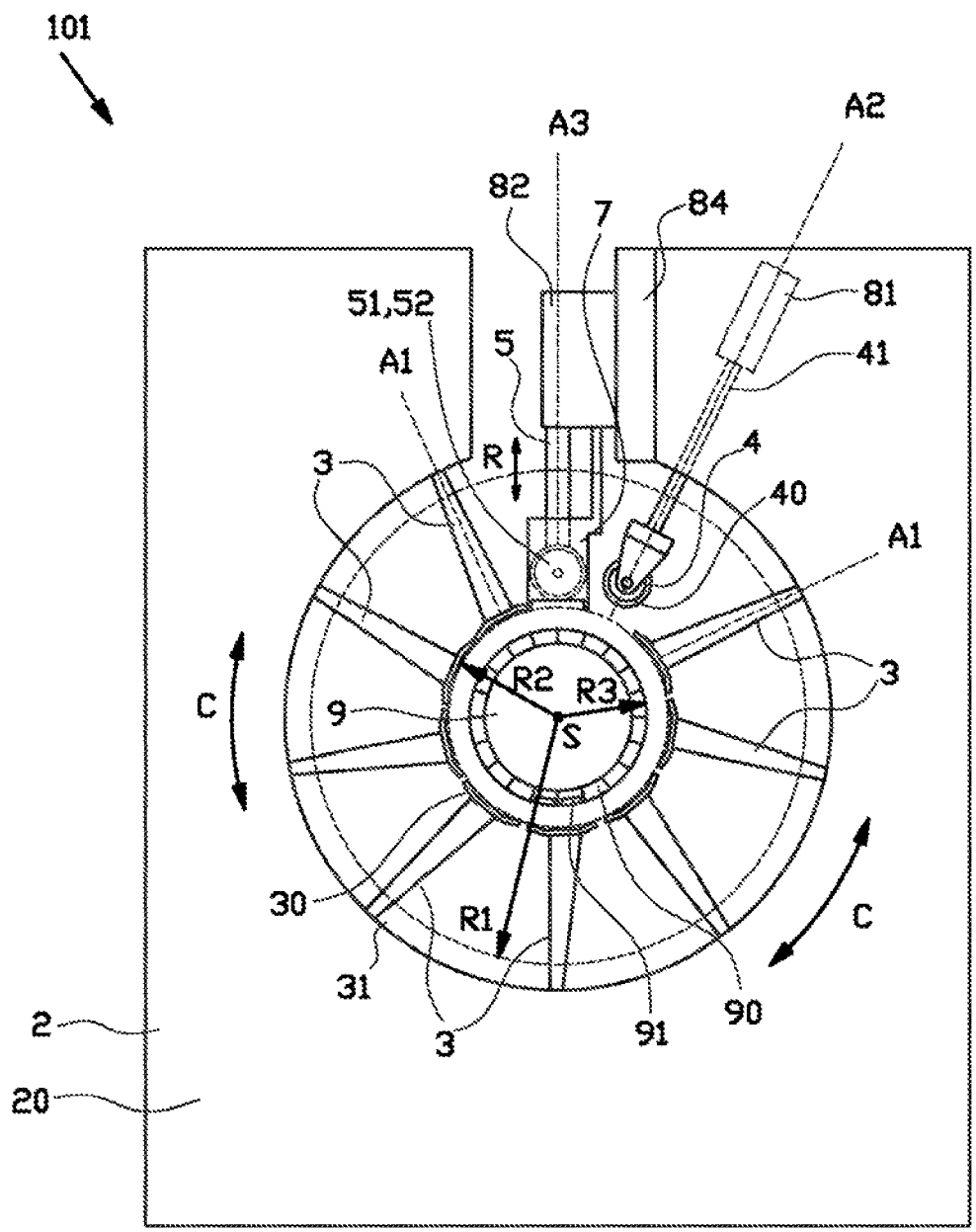
FIG. 5 shows a side view of an alternative transfer apparatus according to a second embodiment of the invention.

FIG. 5 shows an alternative transfer apparatus 101 according to a second embodiment of the invention, which differs from the previously discussed transfer apparatus 1 in that it comprises a third ring segment 7 that is positionable in the third angular position A3 at the second radial distance R2 from the central axis S. The third ring segment 7 may have the same features as the aforementioned second ring segment 6, only now adapted, configured, shaped and/or dimensioned to partially or completely accommodate the second rolling device 5. The third ring segment 7 can thus be used to provide additional support to the one or more plies at the location of the third angular position A3. For this purpose, the alternative transfer apparatus 101 comprises a third ring segment drive 84 to drive the third ring segment 7 in the radial direction R from the second radial distance R2 towards the first radial distance R1 and vice versa.

Figure 8:
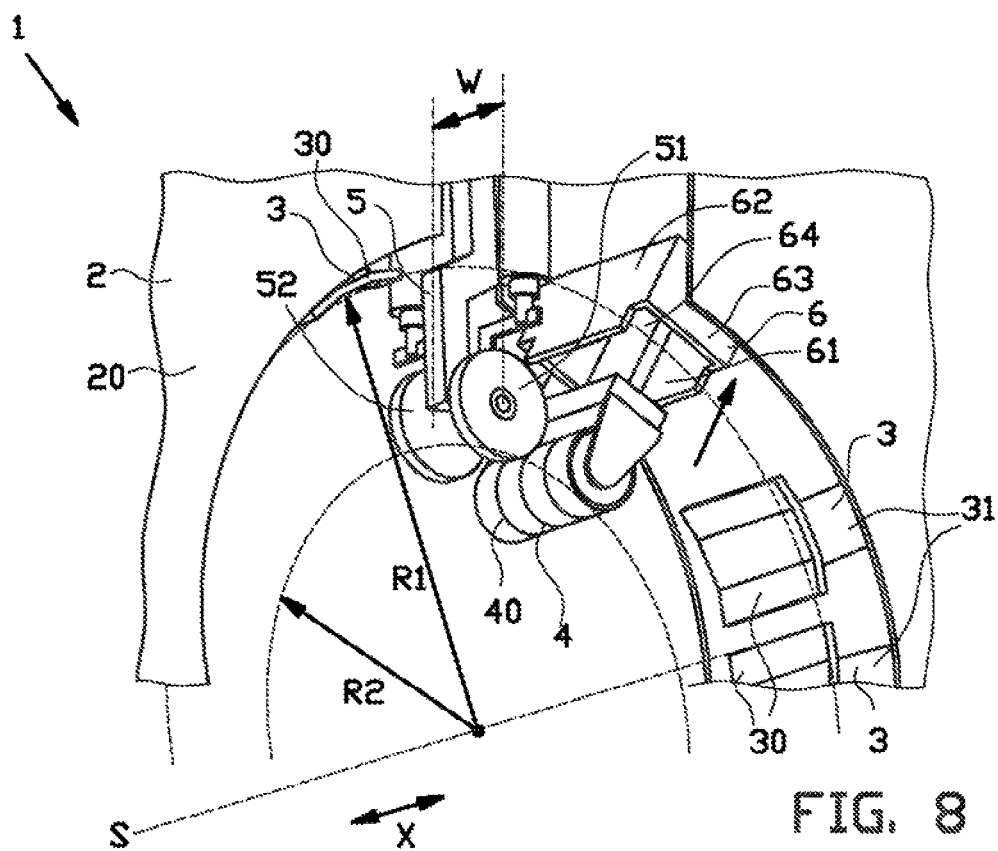
Figure 9:
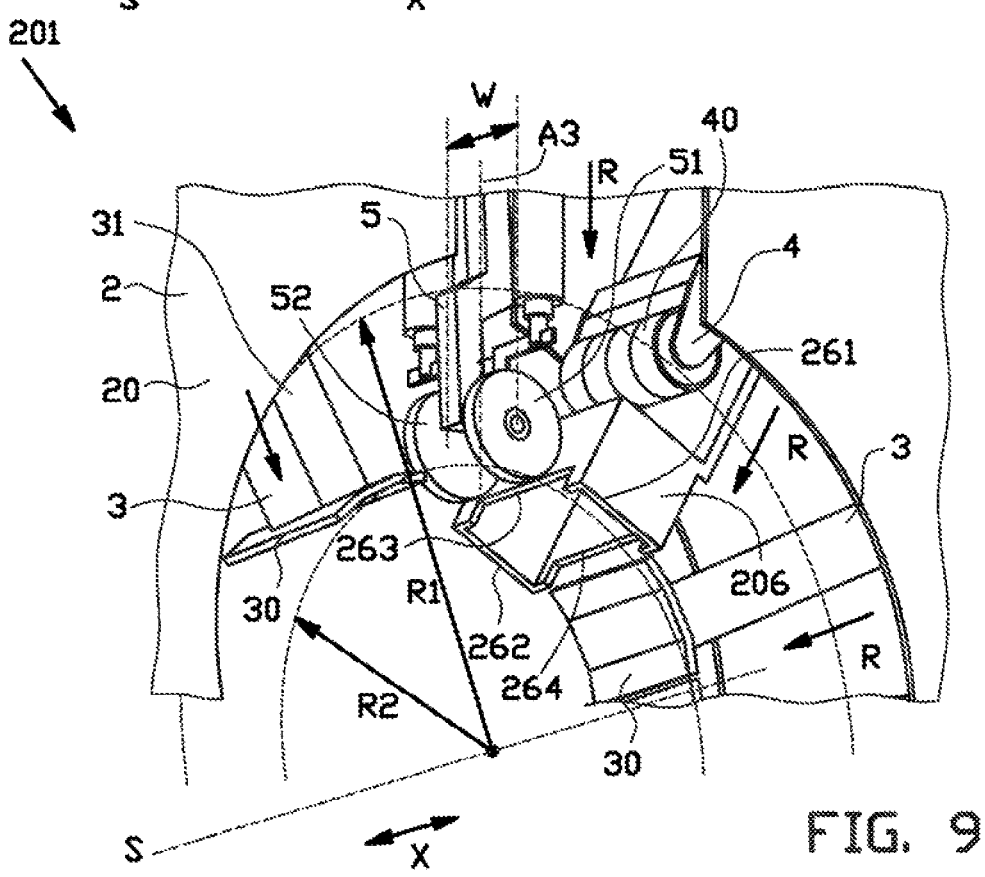
FIG. 9 shows a perspective view of a further alternative transfer apparatus according to a third embodiment of the invention.

FIG. 9 shows a further alternative transfer apparatus 201 according to a third embodiment of the invention, which differs from the previously discussed transfer apparatus 1, 101 in that its second ring segment 206 comprises a first leg 261 extending at a first side of the first rolling device 4 in the axial direction X parallel to the central axis S and a second leg 62 extending at a second side of the first rolling device 4 in the axial direction X opposite to the first side. The two legs 261, 262 are able to contact the one or more plies at the second radial distance R2 at opposite sides of the first rolling device 4 in the axial direction X parallel to the central axis S without interfering with the operation of said first rolling device 4. The second ring segment 206 may again be provided with one or more retaining elements, which in this case may be provided in the legs 261, 262. Similar to the legs 61, 62 as shown in FIG. 6, the legs 261, 262 in FIG. 9 are interconnected by interconnecting members 263, 264 which—in this specific example—extend along a third side of the first rolling device 4 in the circumferential direction C and along a fourth side of the first rolling device 4 opposite to the third side in said circumferential direction C, respectively. In the context of most of the claims, the second ring segment may either be the second ring segment 6 as shown in FIGS. 1-4 and 6-8 or the third ring segment 7 as shown in FIG. 5. Moreover, it is pointed out that the claims do not exclude the possibility of providing both the second ring segment 6 as shown in FIGS. 1-4 and 6-8 and the third ring segment 7 as shown in FIG. 5 in the same transfer apparatus 1, 101, 201 to further optimize the support of the one or more plies during transfer. This can be particularly effective when the first rolling device 4 and the second rolling device 5 are in separate, spaced apart angular positions A2, A3.

A method for transferring one or more plies, in particular breaker plies, onto the carcass package on the tire building drum 9 will now be briefly elucidated below with reference to FIGS. 1-4 and 6-8.

FIGS. 1 and 6 show the situation in which the second ring segment 6 is positioned and/or moved in the radial direction R in the second angular position A2 at the second radial distance R2 from the central axis S. As discussed before, the second ring segment 6 can be moved together, i.e. simultaneously, with first ring segments 3 from the first radial distance R1 to the second radial distance R2. In FIGS. 1 and 6, the first rolling device 4 remains retracted towards, at or near the first radial distance R1. It is noted that, alternatively, the first rolling device 4 may be moved towards or to the second radial distance R2 already prior to or simultaneously with the step of positioning the second ring segment 6 in the second angular position A2 at the second radial distance R2. In that case, the second ring segment 6 would accommodate or move into a position for accommodating the first rolling device 4 at the second radial distance R2.

Figure 2:
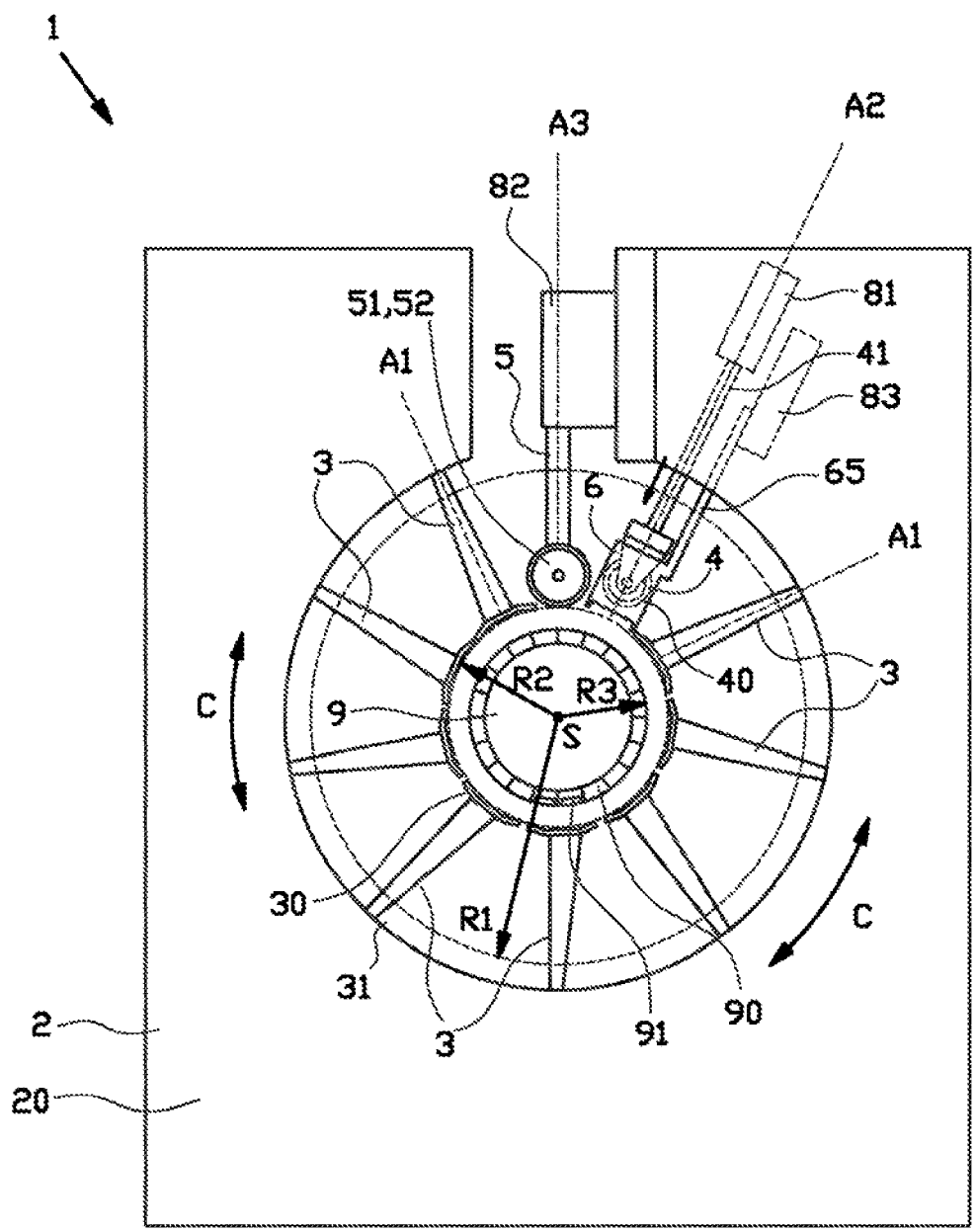

In this example, the first rolling device 4 is moved towards the second radial distance R2 only after the second ring segment 6 is at the second radial distance R2, as shown in FIG. 2. Note that the first rolling device 4 may be stopped just short of the second radial distance R2 to prevent that the first rolling device 4 unintentionally contacts the one or more plies. In particular, the first rolling device 4 may be positioned inside the second ring segment 6, with the legs 61, 62 of the second ring segment 6 protruding beyond the first rolling device 4 in the radial direction R to the second radial distance R2.

FIGS. 3 and 7 show the situation in which the first rolling device 4 and the second ring segment 6 are both moved to or at the second radial distance R2 from the central axis S.

FIGS. 4 and 8 show the situation in which the first rolling device 4 has been moved through the second ring segment 6 towards or to the third radial distance R3 from the central axis S. In this case, the second ring segment 6 is retracted from the second radial distance R2 towards or to the first radial distance R1, thereby passing along or over the first rolling device 4. In other words, the first rolling device 4 has passed entirely through the second ring segment 6. Alternatively, the second ring segment 6 may remain in place at the second radial distance R2, in which case the first rolling device would only extend partially through the second ring segment 6 to contact the one or more plies at the third radial distance R3.

It will be appreciated by one skilled in the art that the aforementioned steps of the method apply mutatis mutandis to the third ring segment 7 of FIG. 5.

Optionally, the method comprises the step of positioning the two shoulder wheels 51, 52, as shown in FIG. 6, in the third angular position A3 at the second radial distance R2 and moving or spacing them apart at in the axial direction X parallel to the central axis S to a width W that matches or substantially matches a width of the one or more plies in said axial direction X. In this way, the two shoulder wheels 51, 52 may provide additional support to the one or more plies during the transfer at the longitudinal edges thereof. It is noted that this principle may be applied independently from the present invention, i.e. without the use of the second ring segment 6 or the third ring segment 7.

As a further option, the method may comprise the step of providing the tire building drum 9 concentrically within the transfer ring 1, i.e. with its rotation axis collinear to the central axis S of the transfer apparatus 1, and rotating the tire building drum 9 about the central axis S into a transfer position, as shown in FIG. 1. In said transfer position, the one or more tip magnets 91 are offset in the circumferential direction C from the second angular position A2 over an offset angle H in the range of ninety degrees to one-hundred-and-eighty degrees, and preferably in the range of one-hundred-and-forty degrees to one-hundred-and-eighty degrees. The tip magnets 91 are typically the magnets on the tire building drum 9 having the strongest magnetic field. By offsetting the one or more tip magnets 91, the influence of this strong magnetic field on the position of the one or more plies at the second angular position A2 can be reduced and/or minimized. It is noted that this principle may also be applied independently from the present invention, i.e. without the use of the second ring segment 6 or the third ring segment 7.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 transfer apparatus
2 transfer ring
20 frame
3 first ring segment
30 gripper head
31 arm
4 first rolling device
40 center roller
41 arm
5 second rolling device
51 shoulder roller
52 shoulder roller
6 second ring segment
61 first leg
62 second leg
63 first connecting member
64 second connecting member
65 arm
7 third ring segment
81 first roller drive
82 second roller drive
83 second ring segment drive
84 third ring segment drive
9 tire building drum
90 drum segment
91 tip magnet
101 alternative transfer apparatus
201 further alternative transfer apparatus
206 second ring segment
261 first leg
262 second leg
263 first interconnecting member
264 second interconnecting member
A1 first angular position
A2 second angular position
A3 third angular position
C circumferential direction
H offset angle
R radial direction
R1 first radial distance R2 second radial distance
R3 third radial distance
S central axis
W width
X axial direction

The invention claimed is:

1. A method for transferring one or more plies onto a carcass package on a tire building drum using a transfer apparatus, wherein the transfer apparatus comprises a transfer ring with a plurality of first ring segments and a frame that extends in a circumferential direction about a central axis for holding the plurality of first ring segments distributed in the circumferential direction along the frame, wherein the plurality of first ring segments are movable relative to the frame in a radial direction perpendicular to the central axis from a first radial distance to a second radial distance from the central axis that is smaller than the first radial distance, wherein the transfer apparatus further comprises two shoulder wheels in an angular position interposed between the plurality of first ring segments in the circumferential direction for stitching the one or more plies to the carcass package on the tire building drum, wherein the two shoulder wheels, at the second radial distance, are movable apart in an axial direction parallel to the central axis to a variable width to match a width of the one or more plies in said axial direction, wherein the method comprises the steps of:

transferring one or more plies onto a carcass package on a tire building drum using the transfer apparatus; and at the second radial distance, moving the two shoulder wheels apart in an axial direction parallel to the central axis to match a width of the one or more plies in said axial direction, wherein the two shoulder wheels are at the second radial distance during the transfer to provide additional support to the one or more plies during the transfer at the longitudinal edges of said one or more plies.

2. The method according to claim 1, wherein the transfer apparatus comprises a further ring segment, wherein the method comprises the step of positioning the further ring segment in the angular position of the two shoulder wheels at the second radial distance from the central axis.

* * * * *